United States Patent
Haga

(10) Patent No.: US 12,145,735 B2
(45) Date of Patent: Nov. 19, 2024

(54) FLYING OBJECT CONTROL DEVICE FOR SWITCHING POWER SUPPLY BASED ON FLIGHT PLAN AND BATTERY STATUS

(71) Applicant: HONDA MOTOR CO., LTD., Tokyo (JP)

(72) Inventor: Hisao Haga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/969,725

(22) Filed: Oct. 20, 2022

(65) Prior Publication Data

US 2023/0202664 A1    Jun. 29, 2023

(30) Foreign Application Priority Data

Dec. 24, 2021   (JP) .................. 2021-211054

(51) Int. Cl.
  *B64D 35/00*    (2006.01)
  *B60L 50/60*    (2019.01)
  *B64D 27/02*    (2006.01)
  *B64D 27/24*    (2024.01)

(52) U.S. Cl.
  CPC ............ *B64D 27/24* (2013.01); *B64D 35/00* (2013.01); *B60L 50/60* (2019.02); *B60L 2200/10* (2013.01); *B64D 27/026* (2024.01)

(58) Field of Classification Search
  CPC .. B64D 27/24; B64D 2027/026; B64D 35/00; B60L 50/60; B60L 2200/10
  USPC ....................................... 244/75.1
  See application file for complete search history.

(56) References Cited

U.S. PATENT DOCUMENTS

| | | | |
|---|---|---|---|
| 10,589,635 B1 | 3/2020 | Solodovnik et al. | |
| 2012/0249061 A1 | 10/2012 | Watanabe | |
| 2014/0346283 A1* | 11/2014 | Salyer ................. | B64C 37/00 903/903 |

(Continued)

FOREIGN PATENT DOCUMENTS

| | | |
|---|---|---|
| JP | 2019-039420 | 3/2019 |
| JP | 2019-506327 | 3/2019 |

(Continued)

OTHER PUBLICATIONS

Japanese Office Action for Japanese Patent Application No. 2021-211054 mailed Apr. 30, 2024.

*Primary Examiner* — Brady W Frazier
(74) *Attorney, Agent, or Firm* — Amin, Turocy & Watson, LLP

(57) ABSTRACT

The flying object control device 1 includes a generator 2, a drive source 3, a battery 4, an electric motor 5, a battery status determination unit 8, and a state-of-charge control unit 11. The battery status determination unit 8 determines a first amount of charge power, which is a current state of charge of the battery. After a flying object starts cruising, the state-of-charge control unit 11 calculates a second amount of charge power, which is a state of charge of the battery 4 required for takeoff during the next flight, based on flight plans 53 and 54 of the flying object, predicts timing of supplying electric power from the generator 2 to the battery 4 based on the first amount of charge power and the second amount of charge power, and starts power supply from the generator 2 to the battery 4 at this timing.

3 Claims, 3 Drawing Sheets

(56) References Cited

U.S. PATENT DOCUMENTS

| | | | |
|---|---|---|---|
| 2015/0367950 A1* | 12/2015 | Rajashekara | B64D 27/10 903/930 |
| 2017/0057650 A1* | 3/2017 | Walter-Robinson | H02J 7/0068 |
| 2019/0002115 A1 | 1/2019 | Miller et al. | |
| 2020/0127586 A1* | 4/2020 | Chretien | B60L 3/0092 |

FOREIGN PATENT DOCUMENTS

| | | |
|---|---|---|
| JP | 2019-077361 | 5/2019 |
| JP | 2020-511350 | 4/2020 |
| JP | 2020-182372 | 11/2020 |
| WO | 2011/077528 | 6/2011 |
| WO | 2018/057702 | 3/2018 |
| WO | 2018/165498 | 9/2018 |

\* cited by examiner

FLYING OBJECT CONTROL DEVICE FOR SWITCHING POWER SUPPLY BASED ON FLIGHT PLAN AND BATTERY STATUS

CROSS-REFERENCE TO RELATED APPLICATION

Priority is claimed on Japanese Patent Application No. 2021-211054 filed Dec. 24, 2021, the content of which is incorporated herein by reference.

BACKGROUND OF THE INVENTION

Field of the Invention

The present invention relates to a flying object control device.

Description of Related Art

Conventionally, flying objects that include a gas turbine engine and a battery that stores electric power generated by the gas turbine engine are known. For these flying objects, various techniques have been proposed to implement more efficient flight control.

For example, Patent Document 1 (Japanese Patent Application, First Publication No. 2019-077361) discloses a configuration of a flying object including a gas turbine engine and a battery. The flying object has a control system that allows switching between operation and stopping of the gas turbine engine based on the amount of power stored in the battery. At least while the gas turbine engine is stopped, electric power for rotating an electric motor (and a propeller) is switched from electric power generated by the gas turbine engine to electric power supplied by the battery.

According to the technique described in Patent Document 1, by performing switching between outputs of the gas turbine engine and the battery, the gas turbine engine can always be used near the maximum output with the best fuel efficiency. This can improve the energy efficiency of the gas turbine engine.

SUMMARY OF THE INVENTION

However, with the technique described in Patent Document 1, every time the amount of power in the battery decreases to a predetermined value, charging is performed until the amount of power in the battery reaches its maximum. For this reason, the time for charging and discharging the battery increases, and there is a risk that deterioration of the battery is likely to progress. Further, since the gas turbine engine is always operated at the maximum output in order to improve fuel efficiency, there is a risk that deterioration of the gas turbine engine is also likely to progress.

Thus, an object of the present invention is to provide a flying object control device that can inhibit deterioration of a drive source and a battery while inhibiting fuel consumption.

In order to solve the above problems, a flying object control device according to the present invention has the following configuration.

(1) A flying object control device according to one aspect of the present invention comprises: a generator mounted in a flying object; a drive source that drives the generator; a battery that stores electric power generated by the generator; an electric motor driven by electric power supplied from at least one of the generator and the battery; a propeller rotated by the electric motor; a switching control unit that allows switching between power supply from the generator to the electric motor and power supply from the battery to the electric motor based on a flight status of the flying object; a battery status determination unit that determines a first amount of charge power, which is a current state of charge of the battery; and a state-of-charge control unit that controls the amount of power supplied from the generator to the battery based on the first amount of charge power determined by the battery status determination unit, wherein the state-of-charge control unit calculates a second amount of charge power, which is a state of charge of the battery required for takeoff in the next flight, based on a flight plan of the flying object after the flying object starts cruising, predicts a timing of supplying electric power from the generator to the battery based on the first amount of charge power and the second amount of charge power, and causes power supply from the generator to the battery to start at the timing.

(2) In the flying object control device according to the above aspect (1), the flying object may include a plurality of generators and a plurality of drive sources, may operate the plurality of generators and the plurality of drive sources when the battery is charged, and may operate one of the plurality of generators and the plurality of drive sources when the battery is discharged.

(3) In the flying object control device according to the above aspect (2), the battery may be charged by the plurality of generators and the plurality of drive sources at each of a timing when the flying object shifts from takeoff to cruise and a timing predicted by the state-of-charge control unit.

According to the aspect (1), the state-of-charge control unit charges the battery with an amount of power required for the next takeoff. For this reason, the amount of charge to the battery and the number of charging and discharging can be reduced as compared to the conventional technique in which the battery is charged to the maximum each time the amount of charge decreases. Thus, deterioration of the battery can be inhibited.

The state-of-charge control unit predicts a charging start timing required to charge the battery with the electric power required for the next takeoff. By starting the charging at the predicted timing, the drive source is operated by the amount of power generated to secure the electric power required for the next takeoff. Thus, fuel consumption in the drive source can be reduced to the minimum. Further, the state-of-charge control unit controls the timing of supplying electric power from the drive source to the battery. Thus, the operation time of the drive source can be reduced, and deterioration of the drive source can be inhibited.

Accordingly, it is possible to provide a flying object control device that can inhibit deterioration of the drive source and the battery while inhibiting fuel consumption.

Further, the flying object stores the electric power required for the next takeoff in the battery at the time of landing. For this reason, in a case in which the flying object performs continuous flight, time loss due to power supply can be inhibited, and the flight plan of the flying object can be efficiently carried out.

According to the aspect (2), since the flying object includes the plurality of drive sources and the plurality of generators, it is possible to cope with, for example, failures of the drive sources and the generators, and safety of the flying object can be improved. By operating the plurality of drive sources and the plurality generators during charging, the battery can be charged rapidly. Thus, it is possible to cope with a sudden increase in required output or the like.

Accordingly, the safety of the flying object can be further enhanced, and the operability of the flying object can be improved.

On the other hand, by operating one of the plurality of drive sources and the plurality of generators when the battery is discharged, deterioration of the drive sources and the generators can be inhibited. Further, since at least one drive source and generator operate during discharging, the amount of discharge from the battery can also be inhibited. Accordingly, it is possible to reduce the time for charge and discharge of the battery and inhibit deterioration of the battery.

By changing the number of drive sources operated in accordance with the required output, the optimum operation point can be set. Accordingly, the amount of energy consumption in the drive sources can be reduced to a minimum.

According to the aspect (3), by limiting the number of times rapid charge of the battery is performed, the time for charging and discharging the battery can be reduced and deterioration of the battery can be inhibited. Here, the flying object consumes the most electric power during takeoff. For this reason, by performing charging at the timing of shift from takeoff to cruise, the charging can be started before the amount of charge in the battery reaches the minimum amount of charge. Accordingly, the load on the battery can be reduced, and deterioration of the battery can be inhibited.

DETAILED DESCRIPTION OF THE INVENTION

An embodiment of the present invention will be described below with reference to the drawings.

(Flying Object Control Device)

Figure 1:
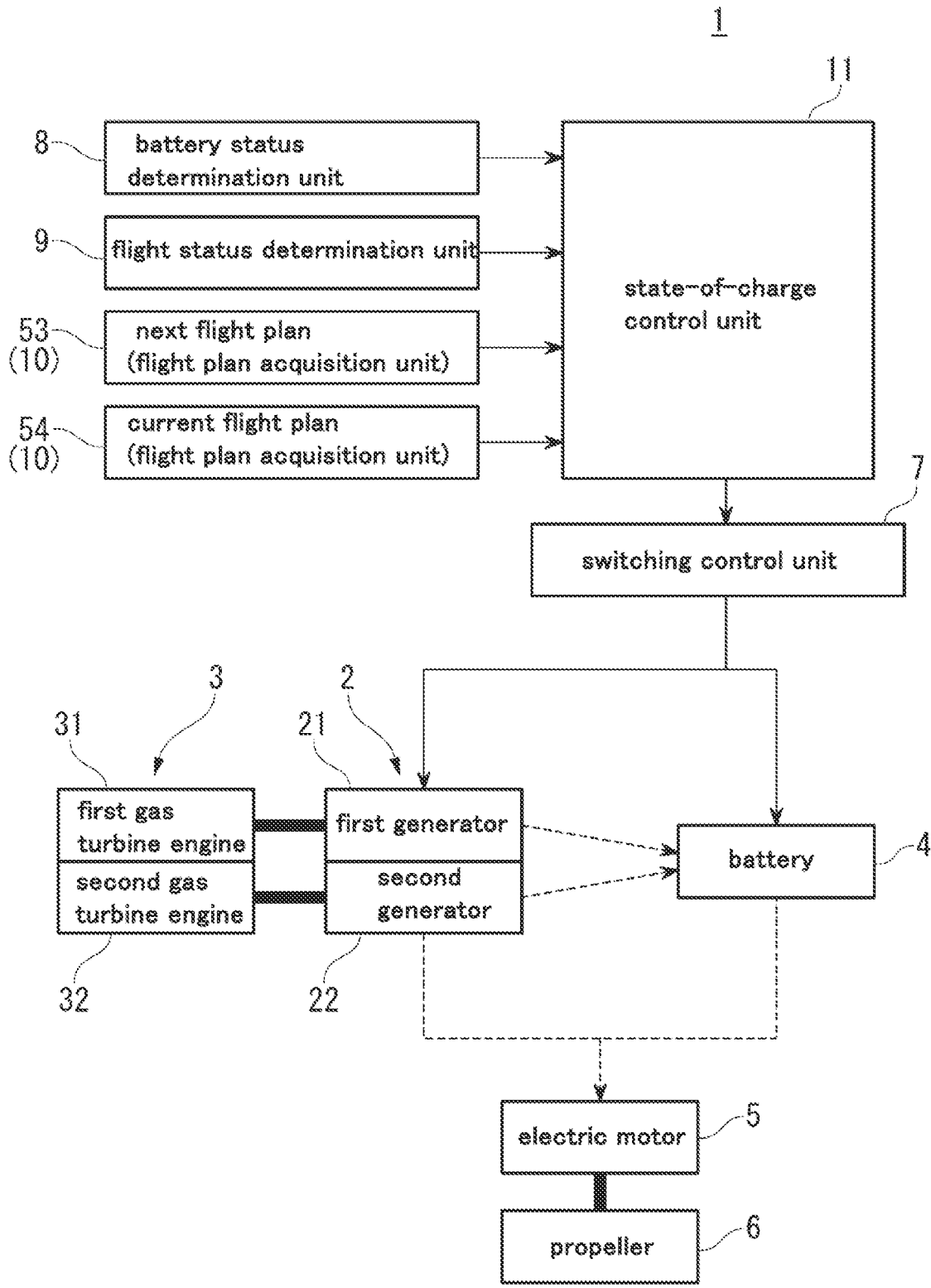
FIG. 1 is a circuit configuration diagram of a flying object control device according to an embodiment.

FIG. 1 is a circuit configuration diagram of a flying object control device 1 (hereinafter sometimes simply referred to as a control device 1) according to an embodiment.

The control device 1 is mounted on, for example, a body of a flying object (not shown) such as an aircraft. The control device 1 constitutes a hybrid propulsion system that propels a flying object using a plurality of electric motors 5 driven by electric power generated by generators 2, which will be described later in detail.

The control device 1 includes a drive source 3, a generator 2, a battery 4, an electric motor 5, a propeller 6, a switching control unit 7, a battery status determination unit 8, a flight status determination unit 9, a flight plan acquisition unit 10, and a state-of-charge control unit 11.

(Drive Source)

The drive source 3 is, for example, a gas turbine engine. Also, although the gas turbine engine 3 is described as an example of the drive source in the present embodiment, the drive source is not limited thereto. The drive source 3 may be a power device for operating the generator 2 to generate electric power and may be, for example, a fuel cell.

In the present embodiment, a plurality of (two in the present embodiment) gas turbine engines 3 are provided. In the following description, the plurality of gas turbine engines 3 may simply be referred to as a gas turbine engine 3 in a case in which they are not distinguished from each other. Each gas turbine engine 3 has a compressor and a turbine. The compressor compresses intake air taken in from ventilation holes (not shown) provided in a body of the aircraft. The turbine is connected to the compressor via a rotating shaft and rotates integrally with the compressor.

(Generator)

The generator 2 is connected to the gas turbine engine 3. In the present embodiment, a plurality of (two in the present embodiment) generators 2 are provided to correspond to each gas turbine engine 3. In the following description, the plurality of generators 2 may simply be referred to as a generator 2 in a case in which they are not distinguished from each other. A transmission mechanism and the like may be provided between the generator 2 and the gas turbine engine 3. The generator 2 generates electric power (AC power) by driving a turbine. The AC power generated by the generator 2 is converted into DC power by a converter of a power drive unit (PDU) and stored in the battery 4.

(Battery)

The battery 4 stores surplus power not consumed by the electric motor 5 out of the electric power generated by the generator 2 by driving the gas turbine engine 3. The electric power stored in the battery 4 can be used as electric power for driving the electric motor 5. That is, when electric power generated by the converter exceeds electric power consumed by an inverter, the battery 4 absorbs surplus power to perform charging. On the other hand, when the electric power generated by the converter falls below the electric power consumed by the inverter, the battery 4 performs discharging to compensate for deficient power.

(Electric Motor)

The electric motor 5 is, for example, a brushless DC motor having a rotor and a stator. The electric motor 5 is connected to the generator 2 and the battery 4. At least one of electric power discharged from the battery 4 and electric power from the generator 2 is supplied to the electric motor 5. Also, the electric motor 5 may include an auxiliary motor (not shown) for attitude maintenance or horizontal propulsion, and the like.

(Propeller)

The propeller 6 is connected to the electric motor 5. A propeller shaft that mechanically connects the electric motor 5 to the propeller 6 is provided between the electric motor 5 and the propeller 6. The propeller 6 rotates as the rotor of the electric motor 5 rotates in accordance with a control signal. The control signal is a signal for controlling the aircraft based on an operation of a pilot or an autopilot instruction.

In other words, the flying object is configured such that the electric motor 5 is driven by the electric power generated by the generator 2 driven mainly by the gas turbine engine 3, and a thrust is obtained by the propeller 6 rotated by the electric motor 5. It is possible to store surplus power generated by the generator 2 in the battery 4 and use the electric power from the battery 4 as electric power for driving the electric motor 5 as needed.

(Switching Control Unit) The switching control unit 7 performs switching between power supply from the generator 2 to the electric motor 5 and power supply from the battery 4 to the electric motor 5. Specifically, the switching control unit 7 controls the generator 2, the battery 4, and the electric motor 5 to achieve at least one of the following states (i) to (iii).

(i) A state in which electric power is supplied from the generator 2 to the electric motor 5 and power supply from the battery 4 to the electric motor 5 is stopped.

(ii) A state in which power supply from the generator 2 to the electric motor 5 is stopped and electric power is supplied from the battery 4 to the electric motor 5.

(iii) A state in which both of the generator 2 and the battery 4 supply electric power to the electric motor 5. In this case, it is possible to change the ratio of the amount of power supplied from each of the generator 2 and the battery 4 as necessary.

The switching control unit 7 performs control to switch to one of the above states (i) to (iii) based on a flight status of the flying object.

(Battery Status Determination Unit)

The battery status determination unit 8 determines a charge state of the battery 4. The battery status determination unit 8 determines, as the charge state of the battery 4, for example, a current state of charge (a first amount of charge power P1) of the battery 4, a charge speed during charging, a discharge speed during discharging, and the like.

(Flight Status Determination Unit)

The flight status determination unit 9 determines a flight status of the flying object by acquiring determination results from various sensors mounted on the flying object. Specifically, the flight status determination unit 9 determines, for example, a current altitude, speed, and attitude of the flying object and calculates a required output of the flying object based on this information. In addition, the flight status determination unit 9 determines information such as power consumption of the electric motor 5, an operating state of the gas turbine, an instruction from the pilot, and a flight route. Also, the flight status determination unit 9 may acquire information related to the flight status other than that described above, such as various types of information via a flight controller.

(Flight Plan Acquisition Unit)

The flight plan acquisition unit 10 acquires a flight plan of the flying object. The flight plan includes information such as takeoff, climb, cruise, descent, and landing of the flying object. The flight plan includes at least a current flight plan 54 and a next flight plan 53. Also, the terms "climb" and "descent" in the embodiment are included in the term "cruise" in the claims.

(State-of-Charge Control Unit)

Results of the battery status determination unit 8, the flight status determination unit 9, and the flight plan acquisition unit 10 are output to the state-of-charge control unit 11. The state-of-charge control unit 11 controls power supply from the generator 2 to the battery 4, power supply from the generator 2 to the electric motor 5, and power supply from the battery 4 to the electric motor 5 based on the results of the battery status determination unit 8, the flight status determination unit 9, and the flight plan acquisition unit 10. Control results of the state-of-charge control unit 11 are output to the switching control unit 7. The switching control unit 7 performs switching between the power supply from the generator 2 to the electric motor 5 and the power supply from the battery 4 to the electric motor 5 based on signals from the state-of-charge control unit 11.

Figure 2:
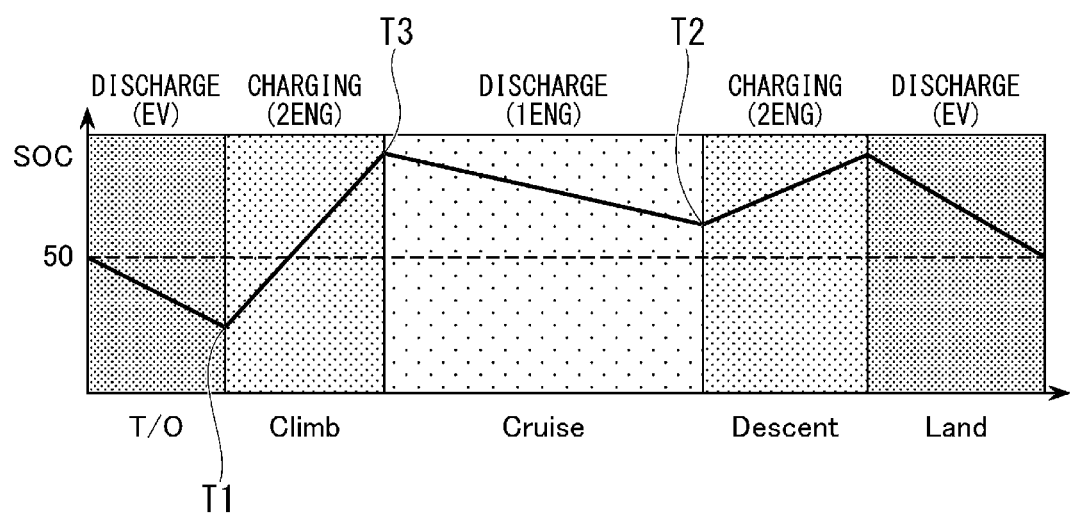
FIG. 2 is a graph showing timings of charging and discharging of a battery according to the embodiment.

FIG. 2 is a graph showing a timing of charging and discharging the battery 4 according to the embodiment. The lower horizontal axis in FIG. 2 represents the attitude of the flying object. The upper horizontal axis in FIG. 2 represents charge and discharge status of the battery 4. The vertical axis in FIG. 2 represents a state of charge (SOC) of the battery 4.

As shown in FIG. 2, the state-of-charge control unit 11 controls charging and discharging of the battery 4.

As shown in FIGS. 1 and 2, when the flying object takes off, electric power is supplied to the electric motor 5 from both the generator 2 and the battery 4. That is, the state-of-charge control unit 11 supplies electric power generated by the generator 2 by driving the gas turbine engine 3 to the electric motor 5 and discharges the battery 4 to supply electric power from the battery 4 to the electric motor 5.

When the flying object reaches a timing T1 (in the present embodiment, a timing when it starts climbing), the switching control unit 7 switches the state to a state in which electric power is supplied from the generator 2 to the electric motor 5 and power supply from the battery 4 to the electric motor 5 is stopped. As a result, electric power required for driving the electric motor 5 out of the electric power generated by the generator 2 by driving the gas turbine engine 3 is supplied to the electric motor 5. The rest of the electric power generated by the generator 2 that has not been consumed by the electric motor 5 is supplied to the battery 4. That is, the state-of-charge control unit 11 charges the battery 4 with the electric power generated by driving the gas turbine engine 3. When the battery 4 is charged during climb, the plurality of generators 2 and gas turbine engines 3 are all in operation.

When the flying object starts cruising, the switching control unit 7 switches the state to a state in which electric power is supplied from both the generator 2 and the battery 4 to the electric motor 5. As a result, all the electric power generated by the generator 2 by driving the gas turbine engine 3 is supplied to the electric motor 5. Further, electric power from the battery 4 is supplied to the electric motor 5. That is, the state-of-charge control unit 11 discharges the battery 4. When the battery 4 is discharged during cruise, one of the plurality of generators 2 and the gas turbine engines 3 is operated. In the present embodiment, only a first generator 21 and a first gas turbine engine 31 of two generators 2 and two gas turbine engines 3 are operated, and operations of a second generator 22 and a second gas turbine engine 32 are stopped.

When the flying object reaches a timing T2 (in the present embodiment, a timing when it starts descending), the switching control unit 7 switches the state again to the state in which electric power is supplied from the generator 2 to the electric motor 5 and power supply from the battery 4 to the electric motor 5 is stopped. As a result, electric power required for driving the electric motor 5 out of the electric power generated by the generator 2 by driving the gas turbine engine 3 is supplied to the electric motor 5. The rest of the electric power generated by the generator 2 that has not been consumed by the electric motor 5 is supplied to the battery 4. That is, the state-of-charge control unit 11 charges the battery 4 with the electric power generated by driving the gas turbine engine 3. When the battery 4 is charged during descent, similarly during ascent, all of the plurality of generators 2 and gas turbine engines 3 are operated.

When the flying object starts landing, the switching control unit 7 switches the state to a state in which electric power is supplied from both the generator 2 and the battery 4 to the electric motor 5. As a result, electric power is supplied to the electric motor 5 from both the gas turbine engine 3 and the battery 4. That is, the state-of-charge control unit 11 supplies electric power generated by the generator 2 by driving the gas turbine engine 3 to the electric motor 5 and discharges the battery 4 to supply electric power from the battery 4 to the electric motor 5.

In this way, the state-of-charge control unit 11 charges the battery 4 at a predetermined timing during flight of the flying object. In the present embodiment, the state-of-charge control unit 11 charges the battery 4 using the plurality of generators 2 and gas turbine engines 3 at two timings, i.e., a timing (a first charging timing T1) when the flying object shifts from takeoff to cruise (including climb) and a timing (a second charging timing T2) predicted by the state-of-charge control unit 11.

The first charging timing T1 is the timing when the flying object shifts from takeoff to cruise (climb) as described above. Since power consumption of the battery 4 is the highest during takeoff, charging of the battery 4 is started immediately after takeoff to prevent a large decrease in the state of charge of the battery 4.

The second charging timing T2 is a timing after the flying object starts cruising, which is a timing predicted by the state-of-charge control unit 11 to be required to charge the battery 4 with electric power required until landing of a current flight and at the time of the next takeoff. That is, the state-of-charge control unit 11 calculates the amount of power that will be required in the future based on the current flight plan 54 and the next flight plan 53 and predicts the second charging timing T2 from the time required to charge the battery 4 with the amount of power.

Prediction control of the state-of-charge control unit 11 will be described in detail below.

First, the state-of-charge control unit 11 starts predictive control of a charging start timing at a predetermined timing (a third timing T3 immediately after shifted from climb to cruise in the present embodiment) after the flying object starts cruising. When the predictive control is started, the state-of-charge control unit 11 calculates the state of charge of the battery 4 (second amount of charge power P2) required for takeoff in the next flight based on the next flight plan 53 of the flying object.

Next, the state-of-charge control unit 11 predicts the second charging timing T2 for supplying electric power from the generator 2 to the battery 4 based on a first amount of charge power P1, which is a current state of charge of the battery 4, a second amount of charge power P2, which is a state of charge of the battery 4 required for the next takeoff, and a third amount of charge power P3, which is a state of charge of the battery 4 required until landing in the current flight plan 54. The second amount of charge power P2 is the total amount of electric power of the battery 4 required at least from the start of the next flight plan 53 to the completion of takeoff. The third amount of charge power P3 is the total amount of electric power of the battery 4 required from the time (current time) when the state-of-charge control unit 11 starts the predictive control until the rest of the cruise, descent, and landing in the current flight plan 54 are completed.

The state-of-charge control unit 11 predicts the second charging timing T2 so that a residual SOC prediction value obtained by subtracting the total amount of the second amount of charge power P2 and the third amount of charge power P3 from the first amount of charge power P1 at the time the present flight is completed becomes equal to or greater than a preset first target amount of charge power PN (P1−(P2+P3)≥PN). In the present embodiment, the first target amount of charge power PN is set to 50% of the total chargeable amount of power of the battery 4 (that is, the charge capacity of the battery 4). Also, the value of the first target amount of charge power PN is not limited thereto.

When the state of the flying object reaches the predicted second charging timing T2, the state-of-charge control unit 11 starts charging the battery 4 by causing the generator 2 to supply electric power to the battery 4.

That is, prediction is started at the third timing T3 in FIG. 2, and charging is started at the predicted second charging timing T2. Also, in the example shown in FIG. 2, the second charging timing T2 and the timing of shifting from cruise to descent coincide with each other, but the present invention is not limited thereto. The second charging timing T2 may be set, for example, at a predetermined timing during cruise (including "during cruise" and "during descent" in the embodiment).

(Flow of Control in State-of-Charge Control Unit)

Figure 3:
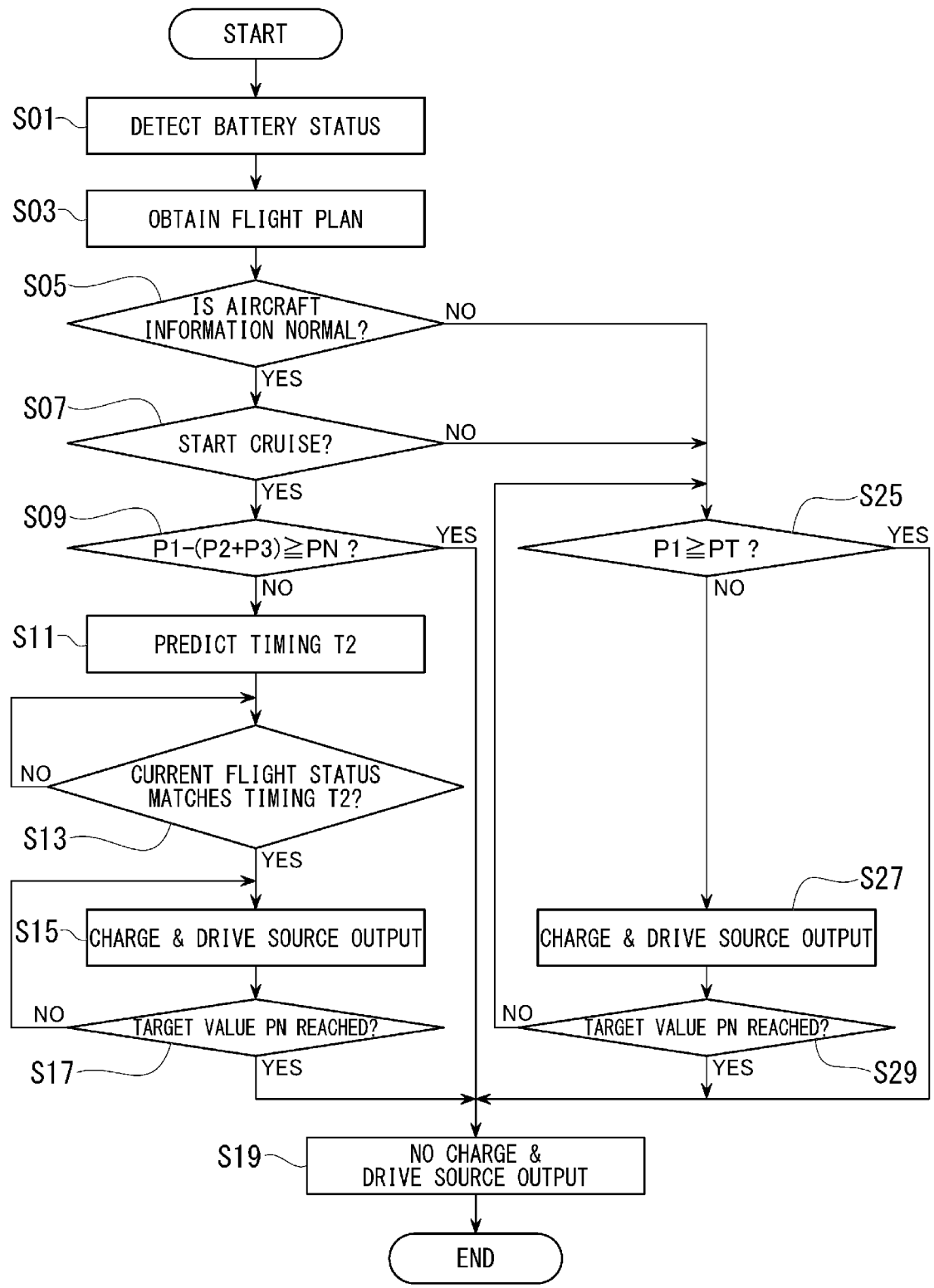
FIG. 3 is a flowchart showing a flow of control performed by the control device according to the embodiment.

FIG. 3 is a flow chart showing a flow of control performed by the control device 1 according to the embodiment. The flow of control in the state-of-charge control unit 11 will be described in more detail below with reference to FIG. 3. FIG. 1 will also be referred to for each reference sign.

First, the state-of-charge control unit 11 determines a state of the battery 4 by acquiring results from the battery status determination unit 8 (step S01). The state-of-charge control unit 11 acquires at least the first amount of charge power P1, which is the current state of charge of the battery 4. Next, the state-of-charge control unit 11 acquires the current flight plan 54 and the next flight plan 53 from the flight plan acquisition unit 10 (step S03).

Next, the state-of-charge control unit 11 acquires information from a flight controller or the like to determine whether or not flying object information is normal (step S05). If it is determined to be normal (YES in step S05), the state-of-charge control unit 11 further determines whether or not the flying object has started cruising (step S07).

If it is determined in step S05 that the flying object information is not normal (NO in step S05) and it is determined in step S07 that the flying object has not started cruising (NO in step S07), the process proceeds to step S25.

In step S25, it is determined whether or not the first amount of charge power P1, which is the current state of charge of the battery 4, is greater than or equal to a second target amount of charge power PT. The second target amount of charge power PT is set to a value different from the first target amount of charge power PN. If the first amount of charge power P1 is equal to or greater than the second target amount of charge power PT (YES in step S25), the state-of-charge control unit 11 causes the gas turbine engine 3 to output without charging the battery 4 (step S19). Then, the process ends.

If the first amount of charge power P1 is smaller than the second target amount of charge power PT in step S25 (NO in step S25), the state-of-charge control unit 11 charges the battery 4 and causes the gas turbine engine 3 to output (step S27). After that, the state-of-charge control unit 11 determines whether or not the first amount of charge power P1 has reached the second target amount of charge power PT (step S29). The state-of-charge control unit 11 continues charging the battery 4 and outputting from the gas turbine engine 3 until the first amount of charge power P1 reaches the second target amount of charge power PT. When the first amount of charge power P1 reaches the second target amount of charge power PT (YES in step S29), the process proceeds to step S19, charging of the battery 4 is stopped, the gas turbine engine 3 is caused to output, and the process ends.

On the other hand, if both steps S05 and S07 are YES, the process proceeds to step S09. In step S09, first, the state-of-charge control unit 11 calculates the second amount of charge power P2 based on the next flight plan 53 acquired in step S03 and calculates the third amount of charge power P3 based on the current flight plan 54. After that, the state-of-charge control unit 11 determines whether or not the residual SOC prediction value obtained by subtracting the total amount of the second amount of charge power P2 and the third amount of charge power P3 from the first amount of charge power P1 is equal to or greater than the first target amount of charge power PN (P1−(P2+P3)≥PN) (step S09). If the residual SOC prediction value is greater than or equal to the first target amount of charge power PN (YES in step S09), the process proceeds to step S19, the gas turbine engine 3 is caused to output without charging the battery 4, and the process ends.

If the residual SOC prediction value is smaller than the first target amount of charge power PN in step S09 (NO in step S09), the state-of-charge control unit 11 calculates the amount of necessary power of the battery 4 based on a difference between the residual SOC prediction value and the first target amount of charge power PN. Further, the state-of-charge control unit 11 predicts the second charging timing T2, which is the timing at which charging of the battery 4 should be started, from the time required to charge the battery 4 with the calculated amount of power of the battery 4, the output of the gas turbine engine 3, and the like (step S11).

Next, the state-of-charge control unit 11 determines whether or not the current flight status matches the predicted second charging timing T2 (step S13). The process of step S13 is repeatedly executed until the current flight status matches the predicted second charging timing T2.

If the current flight status matches the predicted second charging timing T2 (YES in step S13), the state-of-charge control unit 11 charges the battery 4 and causes the gas turbine engine 3 to output (step S15). After that, the state-of-charge control unit 11 determines whether or not the residual SOC prediction value has reached the first target amount of charge power PN (step S17). The state-of-charge control unit 11 continues charging the battery 4 and outputting from the gas turbine engine 3 until the residual SOC prediction value reaches the first target amount of charge power PN.

When the residual SOC prediction value reaches the first target amount of charge power PN (YES in step S17), the process proceeds to step S19, charging of the battery 4 is stopped, the gas turbine engine 3 is caused to output, and the process ends. Thus, the process of the present flowchart ends.

(Operations and Effects)

Next, operations and effects of the flying object control device 1 described above will be described.

According to the flying object control device 1 of the present embodiment, the state-of-charge control unit 11 charges the battery 4 with the amount of power required for the next takeoff. For this reason, the state of charge of the battery 4 and the number of charging and discharging can be reduced as compared to the conventional technique that charges the battery 4 to the maximum each time the state of charge decreases. Thus, deterioration of the battery 4 can be inhibited.

The state-of-charge control unit 11 predicts the charging start timing required to charge the battery 4 with the electric power required for the next takeoff. By starting charging at the predicted timing, the drive source (gas turbine engine 3) is operated by the amount of power generation for securing the electric power required for the next takeoff. Thus, fuel consumption in the gas turbine engine 3 can be reduced to the minimum. Further, the state-of-charge control unit 11 controls the timing T2 at which electric power is supplied from the gas turbine engine 3 to the battery 4. Since this can inhibit the operation time of the gas turbine engine 3, deterioration of the gas turbine engine 3 can be inhibited.

Accordingly, it is possible to provide the flying object control device 1 that can inhibit deterioration of the gas turbine engine 3 and the battery 4 while inhibiting fuel consumption.

Further, the flying object stores the electric power required for the next takeoff in the battery 4 at the time of landing. For this reason, in a case in which the flying object performs continuous flight, time loss due to power supply can be inhibited, and the flight plan of the flying object can be efficiently carried out.

Since the flying object includes a plurality of gas turbine engines 3 and a plurality of generators 2, for example, it is possible to cope with failures of the gas turbine engines 3 and the generators 2, and safety of the flying object can be improved. By operating the plurality of gas turbine engines 3 and generators 2 during charging, the battery 4 can be rapidly charged. This makes it possible to cope with a sudden increase in required output or the like. Accordingly, safety of the flying object can be further enhanced, and operability of the flying object can be improved.

On the other hand, by operating one of the plurality of gas turbine engines 3 and generators 2 when the battery 4 is discharged, deterioration of the gas turbine engines 3 and the generators 2 can be inhibited. Further, since at least one of the gas turbine engines 3 and the generators 2 operates during discharging, the amount of discharge from the battery 4 can also be reduced. Accordingly, the time for charging and discharging the battery 4 can be reduced, and deterioration of the battery 4 can be inhibited.

By changing the number of operating gas turbine engines 3 in accordance with the required output, the optimum operation point can be set. Accordingly, the amount of energy consumption in the gas turbine engines 3 can be reduced to the minimum.

By limiting the number of times for performing rapid charging of the battery 4, the time of charging and discharging the battery 4 can be reduced, and deterioration of the battery 4 can be inhibited. Here, the flying object consumes the most power during takeoff. For this reason, by performing charging at the timing T1 when the flying object shifts from takeoff to cruise, charging can be started before the state of charge of the battery 4 reaches the minimum state of charge. Accordingly, a load on the battery 4 can be reduced, and deterioration of the battery 4 can be inhibited.

Also, the technical scope of the present invention is not limited to the above-described embodiment, and various modified examples can be made without departing from the gist of the present invention.

For example, in the embodiment described above, the configuration in which two generators 2 and two gas turbine engines 3 are provided has been described, but three or more generators 2 and three or more gas turbine engines 3 may be provided.

Although the example in which the gas turbine engine 3 is used as a drive source has been described, the present invention it is not limited thereto. For example, a fuel cell or the like may be used as a drive source.

The state-of-charge control unit 11 may be connected to a control unit of a flying object that controls operations of the flying object. The state-of-charge control unit 11 may be configured as part of the control unit of the flying object.

The second target amount of charge power PT and the first target amount of charge power PN may be set to the same value.

In addition, it is possible to appropriately replace the constituent elements in the above-described embodiments with well-known constituent elements without departing from the scope of the present invention, and the above-described embodiments may be combined as appropriate.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Flying object control device
2 Generator
3 Gas turbine engine (drive source)
4 Battery
5 Electric motor
6 Propeller
7 Switching control unit
8 Battery status determination unit
9 Flight status determination unit
10 Flight plan acquisition unit
11 State-of-charge control unit
53 Next flight plan (flight plan)
54 Current flight plan (flight plan)
P1 First amount of charge power
P2 Second amount of charge power
P3 Third amount of charge power
T1 First charging timing (timing when shifted from takeoff to cruise)
T2 second charging timing (predicted timing)
PN First target amount of charge power
PT Second target amount of charge power

What is claimed is:

1. A flying object control device comprising:
   a generator mounted in a flying object;
   a gas turbine engine that drives the generator;
   a battery that stores electric power generated by the generator;
   an electric motor driven by electric power supplied from at least one of the generator or the battery;
   a propeller rotated by the electric motor;
   a battery sensor that detects a first amount of charge power, which is a current state of charge of the battery;
   a controller that is configured to control an amount of power supplied from the generator to the battery based on the first amount of charge power detected by the battery sensor;
   a flight plan acquisition part that is configured to acquire a flight plan that includes at least a current flight plan and a next flight plan of the flying object, and output the flight plan to the controller; and
   a switching part that is configured to switch between power supply from the generator to the electric motor and power supply from the battery to the electric motor based on a flight status of the flying object in response to signals from the controller,
   wherein the controller is further configured to:
      calculate a second amount of charge power, which is a state of charge of the battery required for takeoff in the next flight, based on the flight plan obtained from the flight plan acquisition part after the flying object starts cruising;
      predict a timing of supplying electric power from the generator to the battery based on the first amount of charge power and the second amount of charge power; and
      cause power supply from the generator to the battery to start at the timing.

2. The flying object control device according to claim 1, wherein the flying object includes a plurality of generators and a plurality of gas turbine engines, and is configured to operate the plurality of generators and the plurality of drive sources gas turbine engines when the battery is charged, and operate one of the plurality of generators or the plurality of gas turbine engines when the battery is discharged.

3. The flying object control device according to claim 2, wherein the battery is charged by the plurality of generators and the plurality of gas turbine engines at each of a timing when the flying object shifts from takeoff to cruise and the timing predicted by the controller.

* * * * *